US009298701B2

(12) United States Patent
Fuji et al.

(10) Patent No.: US 9,298,701 B2
(45) Date of Patent: Mar. 29, 2016

(54) MACHINE TRANSLATION DEVICE, MACHINE TRANSLATION METHOD, AND RECORDING MEDIUM STORING MACHINE TRANSLATION PROGRAM

(71) Applicant: FUJITSU LIMITED, Kawasaki-shi, Kanagawa (JP)

(72) Inventors: Masaru Fuji, Musashino (JP); Tomoki Nagase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 290 days.

(21) Appl. No.: 13/733,340

(22) Filed: Jan. 3, 2013

(65) Prior Publication Data

US 2013/0262077 A1 Oct. 3, 2013

(30) Foreign Application Priority Data

Mar. 29, 2012 (JP) ................................. 2012-077857

(51) Int. Cl.
*G06F 17/28* (2006.01)

(52) U.S. Cl.
CPC ............ *G06F 17/28* (2013.01); *G06F 17/2827* (2013.01)

(58) Field of Classification Search
USPC ....................................................... 704/2–10
See application file for complete search history.

(56) References Cited

U.S. PATENT DOCUMENTS

| 5,408,410 A * | 4/1995 | Kaji .................................. 704/2 |
| 8,515,731 B1 * | 8/2013 | Ramirez Robredo et al. .... 704/2 |
| 2004/0122656 A1 * | 6/2004 | Abir ................................. 704/4 |
| 2007/0112553 A1 * | 5/2007 | Jacobson ......................... 704/2 |
| 2008/0077387 A1 * | 3/2008 | Ariu ................................. 704/3 |
| 2008/0103757 A1 * | 5/2008 | Washizawa et al. ............. 704/2 |
| 2009/0326915 A1 | 12/2009 | Takano et al. |
| 2011/0202332 A1 * | 8/2011 | Abir ................................. 704/4 |
| 2011/0202333 A1 * | 8/2011 | Abir ................................. 704/4 |
| 2011/0202334 A1 * | 8/2011 | Abir ................................. 704/4 |

FOREIGN PATENT DOCUMENTS

| JP | 4-372061 | 12/1992 |
| JP | 5-298359 | 11/1993 |
| JP | 2008-269413 | 11/2008 |

OTHER PUBLICATIONS

Japanese Office Action issued Sep. 1, 2015 in corresponding Japanese Patent Application No. 2012-077857.

* cited by examiner

*Primary Examiner* — Leonard Saint Cyr
(74) *Attorney, Agent, or Firm* — Staas & Halsey LLP

(57) ABSTRACT

A machine translation device that translates a first language sentence into a second language sentence, the machine translation device includes: a translation unit configured to translate the first language sentence or the second language sentence into a third language sentence; and a second language translated sentence output unit configured to output a second language sentence corresponding to the first language sentence using a search result obtained by searching a database that stores more example sentences of a third language than example sentences of a first language and a second language using the translated third language sentence as a search key.

16 Claims, 27 Drawing Sheets

FIG. 4

FIRST LANGUAGE INPUT SENTENCE   　我保管明天完成任务。　⌒41

SECOND LANGUAGE MACHINE-
TRANSLATED SENTENCE   　明日必ず任務を達成することを約束する。　⌒42

SECOND LANGUAGE MACHINE-
TRANSLATED SENTENCE   　明日必ず任務を達成することを保管する。　⌒43

FIG. 5

SECOND LANGUAGE MACHINE-
TRANSLATED SENTENCE

⇩

THIRD LANGUAGE MACHINE-
TRANSLATED SENTENCE

明日必ず任務を達成することを約束する。 ⟵ 42

I am committed to achieving the mission tomorrow. ⟵ 52

THIRD LANGUAGE MACHINE-TRANSLATED SENTENCE — I am committed to achieving the mission tomorrow. ~52

*I am committed* to support the *mission* ~521

*I am committed* to my *mission* ~522

*I am committed* to *achieving* our goals ~523

*I am committed* to the Vision, *Mission*, Culture and success ~524

FIG. 7

| *I am committed to* achieving *the mission* tomorrow. ~52 |
|---|
| *I am committed to* support *the mission* ~521 |

2×6÷(8+7) = 0.80

| *I am committed to* achieving the *mission* tomorrow. ~52 |
|---|
| *I am committed to* my *mission* ~522 |

2×5÷(8+6) = 0.71

| *I am committed to achieving* the mission tomorrow. ~52 |
|---|
| *I am committed to achieving* our goals ~523 |

2×5÷(8+7) = 0.67

| *I am committed to* achieving the *mission* tomorrow. ~52 |
|---|
| *I am committed to* the Vision, *Mission*, Culture and success |

524

2×5÷(8+10) = 0.56

AVERAGE:0.685
55

FIG. 8
SECOND LANGUAGE MACHINE-
TRANSLATED SENTENCE
THIRD LANGUAGE MACHINE-
TRANSLATED SENTENCE
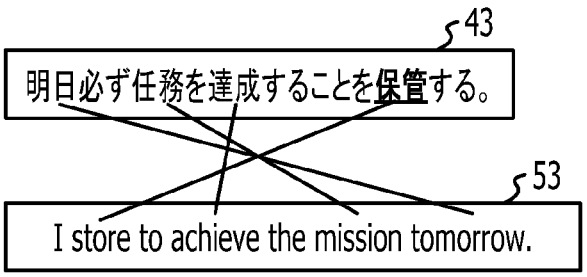

FIG. 9

THIRD LANGUAGE MACHINE-TRANSLATED SENTENCE — I store to achieve the mission tomorrow. ~53

To help us achieve this mission ⋯ for all aspects of store performance ~531

You can help us achieve our mission of ... at our thrift store in the town. ~532

⋯ of the vineyard has in store for them? ⋯ He was to achieve His mission ~533 its way to achieving its goal. ⋯ the convenience store of tomorrow ~534

FIG. 10

| I *store* to *achieve* the *mission* tomorrow. ~53 | 2×3÷(7+12) = 0.32 |
| To help us *achieve* this *mission* ⋯ for all aspects of *store* performance ~531 | |

| I *store* to *achieve* the *mission* tomorrow. ~53 | 2×3÷(7+15) = 0.27 |
| You can help us *achieve* our *mission* of ... at our thrift *store* in the town. ~532 | |

| I *store* to *achieve* the *mission* tomorrow. ~53 | 2×4÷(7+14) = 0.38 |
| ⋯ of the vineyard has in *store* for them? ⋯ He was to *achieve* His *mission* ~533 | |

| I *store* to *achieve* the mission *tomorrow*. ~53 | 2×4÷(7+11) = 0.44 |
| its way to *achieving* its goal. ⋯ the convenience *store* of *tomorrow* ~534 | |

AVERAGE:0.352
56

FIG. 18

| FIRST LANGUAGE INPUT SENTENCE | 我保管明天完成任务。 ₅41 |

| SECOND LANGUAGE MACHINE-TRANSLATED SENTENCE | 明日必ず任務を達成することを保管する。 ₅43 |

FIG. 20

THIRD LANGUAGE MACHINE-
TRANSLATED SENTENCE    | I am committed to achieving the mission tomorrow. |  ⟵71

⇩

| *I am committed* to support the *mission* | ~711

| *I am committed* to my *mission* | ~712

| *I am committed* to *achieving* our goals | ~713

| *I am committed* to the Vision, *Mission*, Culture and success | ~714

FIG. 21

| *I am committed to* achieving *the mission* tomorrow. |~71

| *I am committed to* support *the mission* |~711

2×6÷(8+7) = 0.80

| *I am committed to* achieving the *mission* tomorrow. |~71

| *I am committed to* my *mission* |~712

2×5÷(8+6) = 0.71

| *I am committed to achieving* the mission tomorrow. |~71

| *I am committed to achieving* our goals |~713

2×5÷(8+7) = 0.67

| *I am committed to* achieving the *mission* tomorrow. |~71

| *I am committed to* the Vision, *Mission*, Culture and success |

714

2×5÷(8+10) = 0.56

AVERAGE:0.685
75

THIRD LANGUAGE MACHINE-TRANSLATED SENTENCE | I store to achieve the mission tomorrow. |~72

| To help us *achieve* this *mission* ... for all aspects of *store* performance |~721

| You can help us *achieve* our *mission* of ... at our thrift *store* in the town. |~722

| ... of the vineyard has in *store* for them? ... He was to *achieve* His *mission* |~723

| its way to *achieving* its goal. ... the convenience *store* of *tomorrow* |~724

FIG. 23

| I *store* to *achieve* the *mission* tomorrow. ~72 | 2×3÷(7+12) = 0.32 |
| To help us *achieve* this *mission* ⋯ for all aspects of *store* performance ~721 |

| I *store* to *achieve* the *mission* tomorrow. ~72 | 2×3÷(7+15) = 0.27 |
| You can help us *achieve* our *mission* of ... at our thrift *store* in the town. ~722 |

| I *store* to *achieve* the *mission* tomorrow. ~72 | 2×4÷(7+14) = 0.38 |
| ⋯ of the vineyard has in *store* for them? ⋯ He was to *achieve* His *mission* ~723 |

| I *store* to *achieve* the *mission* tomorrow. ~72 | 2×4÷(7+11) = 0.44 |
| its way to *achieving* its goal. ⋯ the convenience *store* of *tomorrow* ~724 |

AVERAGE:0.352
76

MACHINE TRANSLATION DEVICE, MACHINE TRANSLATION METHOD, AND RECORDING MEDIUM STORING MACHINE TRANSLATION PROGRAM

CROSS-REFERENCE TO RELATED APPLICATION(S)

This application is based upon and claims the benefit of priority of the prior Japanese Patent Application No. 2012-77857, filed on Mar. 29, 2012, the entire contents of which are incorporated herein by reference.

FIELD

The embodiments discussed herein are related to a machine translation device, a machine translation method, and a recording medium storing a machine translation program.

BACKGROUND

In machine translation, a parallel translation dictionary is searched with respect to an input word input in a first language, and a translated sentence of a second language is output. For example, when a plurality of candidates exist as a translated sentence of the second language, information on a second language side is utilized, and an adequate translated sentence is selected.

Related techniques are disclosed in Japanese Laid-open Patent Publication No. 5-298359, Japanese Laid-open Patent Publication No. 4-372061, and Japanese Laid-open Patent Publication No. 2008-269413.

SUMMARY

According to one aspect of the embodiments, a machine translation device that translates a first language sentence into a second language sentence, the machine translation device includes: a translation unit configured to translate the first language sentence or the second language sentence into a third language sentence; and a second language translated sentence output unit configured to output a second language sentence corresponding to the first language sentence using a search result obtained by searching a database that stores more example sentences of a third language than example sentences of a first language and a second language using the translated third language sentence as a search key.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an exemplary processing of a first machine translation unit;
FIG. 5 illustrates an exemplary second machine translation unit;
FIG. 7 illustrates an exemplary processing of a search result aggregate calculation unit;
FIG. 8 illustrates an exemplary processing of a second machine translation unit;
FIG. 9 illustrates an exemplary processing of a search request unit and an exemplary processing of a third language search unit;
FIG. 10 illustrates an exemplary processing of a search result aggregate calculation unit;
FIG. 18 illustrates an exemplary processing of a first machine translation unit;
FIG. 20 illustrates an exemplary processing of a search request unit and an exemplary processing of a third language search unit;
FIG. 21 illustrates an exemplary processing of a search result aggregate calculation unit;
FIG. 23 illustrates an exemplary processing of a search result aggregate calculation unit.

DESCRIPTION OF EMBODIMENTS

In order to select an adequate translated sentence, for example, the occurrence frequency of a combination (a word pair) of a word included in a first language sentence and a word included in a second language sentence is counted, and when the occurrence frequency is more than a specified value, the word of the first language in the word pair may be determined as a translated word due to the second language. For example, a semantic relationship dictionary in which translated-word revised by a user is stored may be used for translated-word selection. For example, using parallel translation data where first language simple sentence data and second language simple sentence data are associated with each other and parallel translation data where the second language simple sentence data and third language simple sentence data are associated with each other, a first language sentence may be translated into a third language sentence.

For example, when the occurrence frequency of a word pair is low or a translated word or parallel translation data, stored in the semantic relationship dictionary, is insufficient, the accuracy of translation may be reduced.

When a first language sentence is machine-translated into a second language sentence, the corpus of a third language is used where example sentences exist whose number is larger than the first language and the second language. Therefore, the accuracy of machine translation may be improved.

The corpus of the third language is searched using the second language sentence obtained by machine-translating the first language sentence, and a translated sentence of the second language may be selected from a search result. For example, a plurality of translated sentences of the second language may be obtained by the machine translation from an input sentence of the first language.

Figure 1:
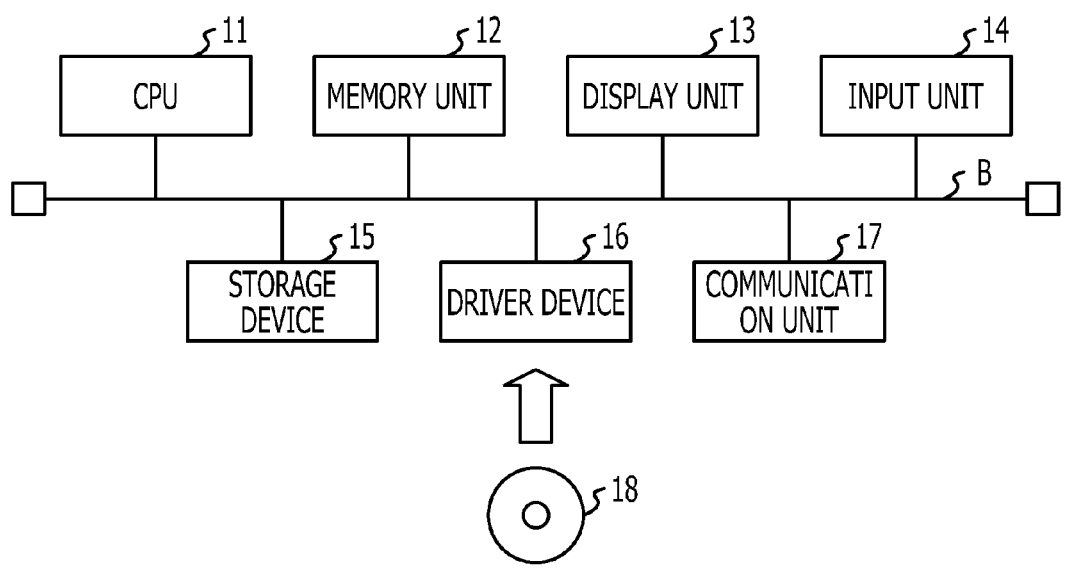
FIG. 1 illustrates an exemplary machine translation device.

FIG. 1 illustrates an exemplary machine translation device. FIG. 1 may illustrate a hardware configuration of the machine translation device.

A machine translation device 100 illustrated in FIG. 1 may be controlled by a computer. The machine translation device 100 includes a Central Processing Unit (CPU) 11, a memory unit 12, a display unit 13, an input unit 14, a storage device 15, a driver device 16, and a communication unit 17. In the machine translation device 100, the CPU 11, each unit, and each device are coupled via a system bus B.

The CPU 11 controls the machine translation device 100 in accordance with a program stored in the memory unit 12. The memory unit 12 includes a Random Access Memory (RAM), a Read-Only Memory (ROM), and the like and stores therein the program executed in the CPU 11, data for processing performed by the CPU 11, or data obtained by the processing performed in the CPU 11. A partial region in the memory unit 12 may be assigned as a work area used for the processing performed by the CPU 11.

The display unit 13 displays various kinds of information under the control of the CPU 11. The input unit 14 includes a mouse, a keyboard, or the like and is used in order for a user to input various kinds of information for processing of the machine translation device 100.

The storage device 15 may be, for example, a hard disk unit, and stores therein data such as a program executing various kinds of processing.

A program executing processing in the machine translation device 100 may be provided to the machine translation device 100 by, for example, a storage medium 18 such as a Compact Disk Read-Only Memory (CD-ROM). For example, when the storage medium 18 in which the program has been stored has been set in the driver device 16, the driver device 16 reads the program from the storage medium 18 and the read program is installed into the storage device 15 through the system bus B. When the program has been activated, the CPU 11 starts processing in accordance with the program installed into the storage device 15.

The medium storing therein the program may be a CD-ROM, or may be a computer readable medium. When the machine translation device 100 performs network communication with the outside, the program executing processing in the machine translation device 100 may be downloaded through a network by the communication unit 17, and may be installed into the storage device 15. When the machine translation device 100 includes an interface such as a Universal Serial Bus (USB) establishing connection with an external storage device, the program may be loaded from an external storage medium by a USB connection.

Figure 2:
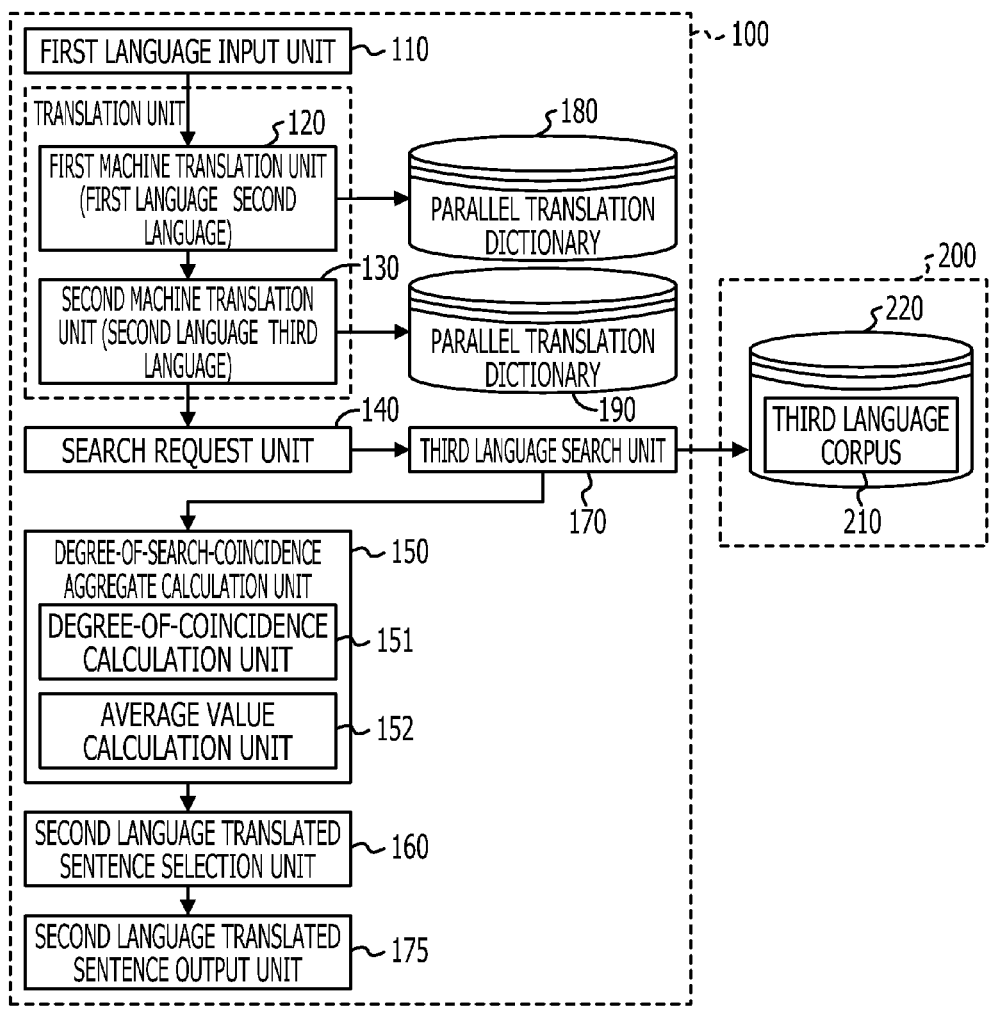
FIG. 2 illustrates an exemplary machine translation device.

FIG. 2 illustrates an exemplary machine translation device. FIG. 2 may illustrate, for example, the functional configuration of the machine translation device illustrated in FIG. 1.

The machine translation device 100 includes a first language input unit 110, a first machine translation unit 120, a second machine translation unit 130, a search request unit 140, a degree-of-search-coincidence aggregate calculation unit 150, a second language translated sentence selection unit 160, a third language search unit 170, and a second language translated sentence output unit 175. The machine translation device 100 includes parallel translation dictionary databases 180 and 190. The machine translation device 100 is coupled to a database device 200 through, for example, a network or the like. The database device 200 may include a storage device 220 in which a third language corpus 210 is stored. In the third language corpus 210, texts (example sentences) of a third language are structured and integrated on a large scale.

The first language input unit 110 accepts an input sentence of a first language. The input sentence of the first language, accepted by the first language input unit 110, is input to the first machine translation unit 120. With reference to the parallel translation dictionary database 180, the first machine translation unit 120 translates the input sentence of the first language into a translated sentence of a second language and outputs the translated sentence of a second language to the second machine translation unit 130, as a translated sentence of the second language. In the parallel translation dictionary database 180, a dictionary may be stored that indicates a correspondence relationship between the first language and the second language.

The translated sentence of the second language, output from the first machine translation unit 120, is input to the second machine translation unit 130. The second machine translation unit 130 translates the translated sentence of the second language into a translated sentence of the third language with reference to the parallel translation dictionary database 190, and outputs, to the search request unit 140, the translated sentence of the second language and the translated sentence of the third language corresponding to the translated sentence of the second language. In the parallel translation dictionary database 190, a dictionary is stored that indicates a correspondence relationship between the second language and the third language. The first machine translation unit 120 and the second machine translation unit 130 may be included in a translation unit including a multilingual translation function.

The search request unit 140 outputs the translated sentence of the second language and the translated sentence of the third language, to the third language search unit 170. The search request unit 140 makes a search request for the third language corpus 210 based on the translated sentence of the third language.

Using the translated sentence of the third language as a search key, the third language search unit 170 searches the third language corpus 210 stored in the storage device 220 in the database device 200. The third language search unit 170 performs fuzzy search on the third language corpus 210. The fuzzy search means, for example, flexibly interpreting a sentence not completely coinciding with a translated sentence serving as a search key, a difference in an expression, or a synonymous word and performing search.

As the search result of the third language search unit 170, a plurality of example sentences of the third language may be obtained. The third language search unit 170 makes a pair of the translated sentence of the second language, output from the search request unit 140, the translated sentence of the third language corresponding to the second language, and the plural example sentences of the third language, obtained as the search result, and supplies the pair to the degree-of-search-coincidence aggregate calculation unit 150.

The degree-of-search-coincidence aggregate calculation unit 150 includes a degree-of-coincidence calculation unit 151 and an average value calculation unit 152, aggregates the degree of coincidence between a search result acquired by the search request unit 140 and the search key, and calculates an average value. The search key may be the translated sentence of the third language. The search result may be the plural example sentences of the third language. The degree-of-search-coincidence aggregate calculation unit 150 outputs, to the second language translated sentence selection unit 160, the translated sentence of the second language, the corresponding translated sentence of the third language, and a corresponding example sentence of the third language, along with a calculation result.

Based on the calculation result of the degree-of-search-coincidence aggregate calculation unit 150, the second language translated sentence selection unit 160 selects one sentence from a plurality of translated sentences of the second language, obtained in the first machine translation unit 120, and outputs the selected sentence to the second language translated sentence output unit 175. The second language translated sentence output unit 175 outputs, as a translated sentence of the second language of the input sentence of the first language, the translated sentence of the second language, output from the second language translated sentence selection unit 160.

The machine translation of the first machine translation unit 120 and the second machine translation unit 130 in the machine translation device 100 may include a technique mechanically converting a natural language into another natural language, and may include a method of the related art.

The database device 200 may include substantially the same hardware configuration as or a hardware configuration similar to, for example, the machine translation device 100. The third language corpus 210 stored in the storage device 220 included in the database device 200 may be a corpus where many more example sentences exist, compared with the corpora of the first language and the second language. The third language corpus 210 may include many example sentences.

The machine translation device 100 may include the third language search unit 170. The machine translation device 100 may be used as, for example, a machine translation system where the third language search unit 170 or the parallel translation dictionary databases 180 and 190 are included in the database device 200. The machine translation device 100 may be used as, for example, one device including the machine translation device 100 and the database device 200.

Figure 3:
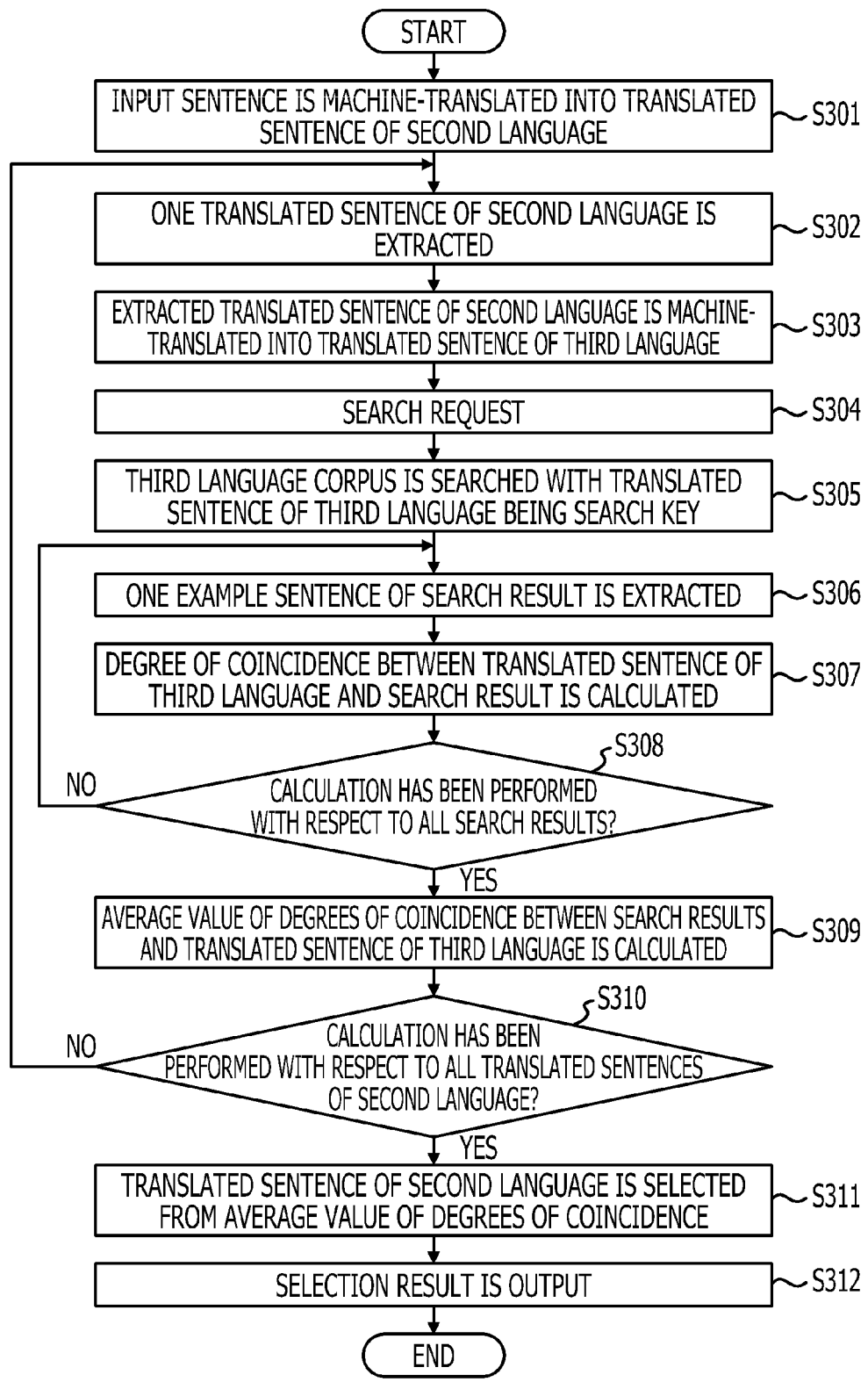
FIG. 3 illustrates an exemplary operation of a machine translation device.

FIG. 3 illustrates an exemplary operation of a machine translation device. The operation illustrated in FIG. 3 may be executed by the machine translation device illustrated in FIG. 1 or FIG. 2.

When the first language input unit 110 in the machine translation device 100 has accepted an input sentence of the first language, the first machine translation unit 120 translates the input sentence of the first language into a translated sentence of the second language, and delivers a plurality of translated sentences, which are translation results, to the second machine translation unit 130 (an operation S301).

The second machine translation unit 130 extracts one translated sentence from the plural translated sentences of the second language delivered from the first machine translation unit 120 (an operation S302). The second machine translation unit 130 translates the extracted translated sentence into a translated sentence of the third language, and delivers a translation result to the search request unit 140 (an operation S303).

The search request unit 140 requests the third language search unit 170 to search the third language corpus 210 using the received translated sentence of the third language as a search key (an operation S304). Upon receiving the search request, the third language search unit 170 accesses the database device 200, and searches the third language corpus 210 using the translated sentence of the third language received in the operation S304 as a search key (an operation S305). The search result may be acquired as, for example, a plurality of example sentences. The example sentences of the acquired search result are delivered to the degree-of-search-coincidence aggregate calculation unit 150.

The degree-of-search-coincidence aggregate calculation unit 150 extracts one example sentence from the example sentences of the search result (an operation S306). The degree-of-coincidence calculation unit 151 in the degree-of-search-coincidence aggregate calculation unit 150 calculates the degree of coincidence between the extracted example sentence and the translated sentence of the third language serving as the search key (an operation S307). The degree-of-coincidence calculation unit 151 calculates, as the degree of coincidence, the allocation of words coincident in the total number of words of the two sentences. The calculated degree of coincidence may be temporarily stored in, for example, a predetermined storage area included in the memory unit 12.

The degree-of-search-coincidence aggregate calculation unit 150 determines whether or not the degrees of coincidence have been calculated with respect to all example sentences of the search result (an operation S308). When all example sentences of the search result have not been subjected to calculation, the processing returns to the operation S306. When all the example sentences of the search result have been subjected to calculation, the average value calculation unit 152 in the degree-of-search-coincidence aggregate calculation unit 150 calculates an average value of the degrees of coincidence between individual example sentences of the search result and the translated sentence serving as the search key (an operation S309). The calculated average value may be temporarily stored in, for example, a predetermined storage area included in the memory unit 12.

The degree-of-search-coincidence aggregate calculation unit 150 determines whether or not, with respect to all translated sentences of the second language from the first machine translation unit 120 in the operation S302, the processing operations from the operation S303 to the operation S309 have been performed (an operation S310). When the processing operations with respect to all the translated sentences of the second language have not been performed, the processing returns to the operation S302.

When the processing operations with respect to all the translated sentences of the second language have been performed, the second language translated sentence selection unit 160 selects, as a translated sentence of the second language corresponding to the input sentence of the first language, a translated sentence of the second language corresponding to a translated sentence of the third language where the average value of the degrees of coincidence is the highest (an operation S311). The second language translated sentence output unit 175 outputs the selected translated sentence of the second language (an operation S312). As the configuration of an output, for example, the selected translated sentence of the second language may be displayed in the display unit 13.

In FIG. 4 to FIG. 11, for example, the first language may be the Chinese language, the second language may be the Japanese language, and the third language may be the English language.

FIG. 4 illustrates an exemplary processing of a first machine translation unit. The first machine translation unit illustrated in FIG. 4 may be the first machine translation unit illustrated in FIG. 2. When an input sentence 41 of the first language has been input, the first machine translation unit 120 refers to the parallel translation dictionary database 180 and translates the input sentence 41 into a translated sentence of the second language. In FIG. 4, as translated sentences corresponding to the input sentence 41, a translated sentence 42 and a translated sentence 43 are obtained and supplied to the second machine translation unit 130.

FIG. 5 illustrates an exemplary second machine translation unit. The second machine translation unit illustrated in FIG. 5 may be the second machine translation unit illustrated in FIG. 2. The second machine translation unit 130 extracts the translated sentence 42, refers to the parallel translation dictionary database 190, and translates the translated sentence 42 into a translated sentence 52 of the third language. The translated sentence 52 of the third language is delivered to the search request unit 140, as a search key of the third language corpus 210.

Figure 6:
FIG. 6 illustrates an exemplary processing of a search request unit and a third language search unit.

FIG. 6 illustrates an exemplary processing of a search request unit and a third language search unit. The search request unit and the third language search unit, illustrated in FIG. 6, may be the search request unit and the third language search unit, illustrated in FIG. 2. When having received the translated sentence 52 of the third language, the search request unit 140 requests the third language search unit 170 to make a search using the translated sentence 52 as a search key. The third language search unit 170 performs fuzzy search on the third language corpus 210 using the translated sentence 52 as the search key, and acquires a search result. In FIG. 6, as the search result, search result sentences 521, 522, 523, and 524 may be acquired. The four search result sentences 521 to 524 are supplied to the degree-of-search-coincidence aggregate calculation unit 150.

FIG. 7 illustrates an exemplary processing of a search result aggregate calculation unit. The search result aggregate calculation unit illustrated in FIG. 7 may be the search result aggregate calculation unit illustrated in FIG. 2. In the degree-of-search-coincidence aggregate calculation unit 150, the degree-of-coincidence calculation unit 151 extracts the search result sentence 521, and calculates the degree of coincidence with the translated sentence 52 serving as the search key.

In FIG. 7, the number of words included in the translated sentence 52 may be eight, and the number of words included in the search result sentence 521 may be seven. The number of words coincident in the translated sentence 52 and the search result sentence 521 is six. Therefore, as the allocation of coincident words with respect to the total number of words of the translated sentence 51 and the search result sentence 521, the degree-of-coincidence calculation unit 151 calculates 2×6÷(8+7)=0.80, as the degree of coincidence between the translated sentence 52 and the search result sentence 521. The degree-of-coincidence calculation unit 151 also performs substantially the same calculation with respect to the search result sentences 522, 523, and 524, and individually calculates the degrees of coincidence between the translated sentence 52 and the individual search result sentences 521 to 524, respectively.

The average value calculation unit 152 calculates the average value of the degrees of coincidence between the translated sentence 52 and the individual search result sentences 521 to 524. In FIG. 7, since the degrees of coincidence between the translated sentence 52 and the search result sentences 521 to 524 are 0.80, 0.71, 0.67, and 0.56, respectively, the average value calculation unit 152 calculates an average value 55 of the four degrees of coincidence. The average value 55=0.685 may be satisfied. The average value 55 may be a value calculated according to the translated sentence 42 of the second language.

When the average value of the degrees of coincidence between the translated sentence 52 and the search result sentences 521 to 524 has been calculated, the machine translation device 100 performs substantially the same processing with respect to the second translated sentence 43 of the second language. In the calculation of the degree of coincidence and the average value of the degrees of coincidence, for example, rounding off to two decimal places may be adopted.

FIG. 8 illustrates an exemplary processing of a second machine translation unit. A second machine translation unit 130 illustrated in FIG. 8 may be the second machine translation unit illustrated in FIG. 2. The second machine translation unit 130 translates the translated sentence 43 of the second language into a translated sentence 53 of the third language.

FIG. 9 illustrates an exemplary processing of a search request unit and a third language search unit. A search request unit 140 and a third language search unit 170, illustrated in FIG. 9, may be the search request unit and the third language search unit, illustrated in FIG. 2. When having received the translated sentence 53 of the third language, the search request unit 140 requests the third language search unit 170 to make a search using the translated sentence 53 as a search key. The third language search unit 170 performs fuzzy search on the third language corpus 210 using the translated sentence 53 as the search key, and acquires a search result. In FIG. 9, as the search result, search result sentences 531, 532, 533, and 534 are delivered to the degree-of-search-coincidence aggregate calculation unit 150.

FIG. 10 illustrates an exemplary processing of a search result aggregate calculation unit. A search result aggregate calculation unit 15 illustrated in FIG. 10 may be the search result aggregate calculation unit illustrated in FIG. 2. The degree-of-coincidence calculation unit 151 in the degree-of-search-coincidence aggregate calculation unit 150 calculates the degree of coincidence between the translated sentence 53 and each of the search result sentences 531 to 534.

The number of words included in the translated sentence 53 may be seven, and the number of words included in the search result sentence 531 may be twelve. The number of words coincident in the translated sentence 53 and the search result sentence 531 may be three. Therefore, as the allocation of coincident words in the total number of words of the translated sentence 53 and the search result sentence 531, the degree-of-coincidence calculation unit 151 calculates 2×3÷(7+12)=0.32, as the degree of coincidence between the translated sentence 53 and the search result sentence 531. The degree-of-coincidence calculation unit 151 also performs substantially the same calculation with respect to the search result sentences 532, 533, and 534, and the degrees of coincidence between the translated sentence 53 and the individual search result sentences 531 to 534 are individually calculated.

The average value calculation unit 152 calculates the average value of the degrees of coincidence between the translated sentence 53 and the individual search result sentences 531 to 534, respectively. In FIG. 10, the degrees of coincidence between the translated sentence 53 and the search result sentences 531 to 534 may be 0.32, 0.27, 0.38, and 0.44, respectively. The average value calculation unit 152 calculates an average value 56 of the four degrees of coincidence. In FIG. 10, the average value=0.352 may be satisfied. The average value 56 may be a value calculated according to the translated sentence 43.

The degree-of-search-coincidence aggregate calculation unit 150 determines whether or not average values have been calculated with respect to all the translated sentences of the second language that is obtained by the translation of the first machine translation unit 120. Since the translated sentences of the second language obtained in FIG. 4 are the translated sentence 42 and the translated sentence 43, the machine translation device 100 proceeds to subsequent processing.

Figure 11:
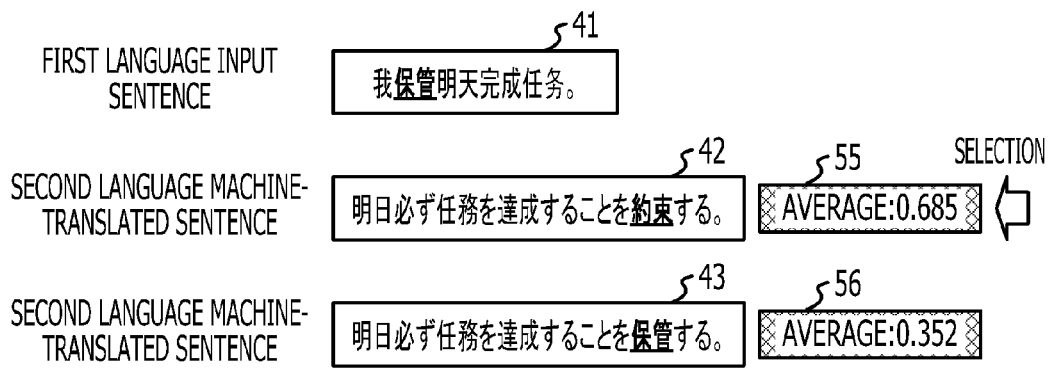
FIG. 11 illustrates an exemplary processing of a second language translated sentence selection unit.

FIG. 11 illustrates an exemplary processing of a second language translated sentence selection unit. A second language translated sentence selection unit 15 illustrated in FIG. 11 may be the second language translated sentence selection unit illustrated in FIG. 2. As a translated sentence of the second language of the input sentence 41, the second language translated sentence selection unit 160 selects one translated sentence whose average value is larger, from among the translated sentence 42 and the translated sentence 43, obtained in the first machine translation unit 120.

In FIG. 11, the average value 55 corresponding to the translated sentence 42 may be 0.685, and the average value 56 corresponding to the translated sentence 43 may be 0.352. Therefore, the second language translated sentence selection unit 160 selects the translated sentence 42 as the translated sentence of the second language of the input sentence 41. The selected translated sentence 42 is output by the second language translated sentence output unit 175.

When a plurality of translated sentences of the second language corresponding to the input sentence of the first language have been obtained, the input sentence of the first language is translated into the third language including sufficient example sentences in translated sentences of the second language. The third language corpus 210 is searched with a translated sentence of the third language, and a translated sentence of the second language is output that corresponds to a translated sentence of the third language where the degree of coincidence with a search result is high as a translated sentence of the second language of the input sentence.

Since the third language corpus 210 including abundant example sentences is used, the ambiguity of translation may be reduced that occurs when, for example, a plurality of translated sentences of the second language have been obtained. Since the third language corpus 210 including abundant example sentences is used, when a plurality of translated sentences of the second language have been obtained with respect to the input sentence of the first language, a correct translated sentence of the second language is selected. Therefore, the accuracy of translation may be improved.

After it has been determined whether or not the third language corpus 210 includes abundant example sentences, a translated sentence of the second language may be translated into a translated sentence of the third language.

Figure 12:
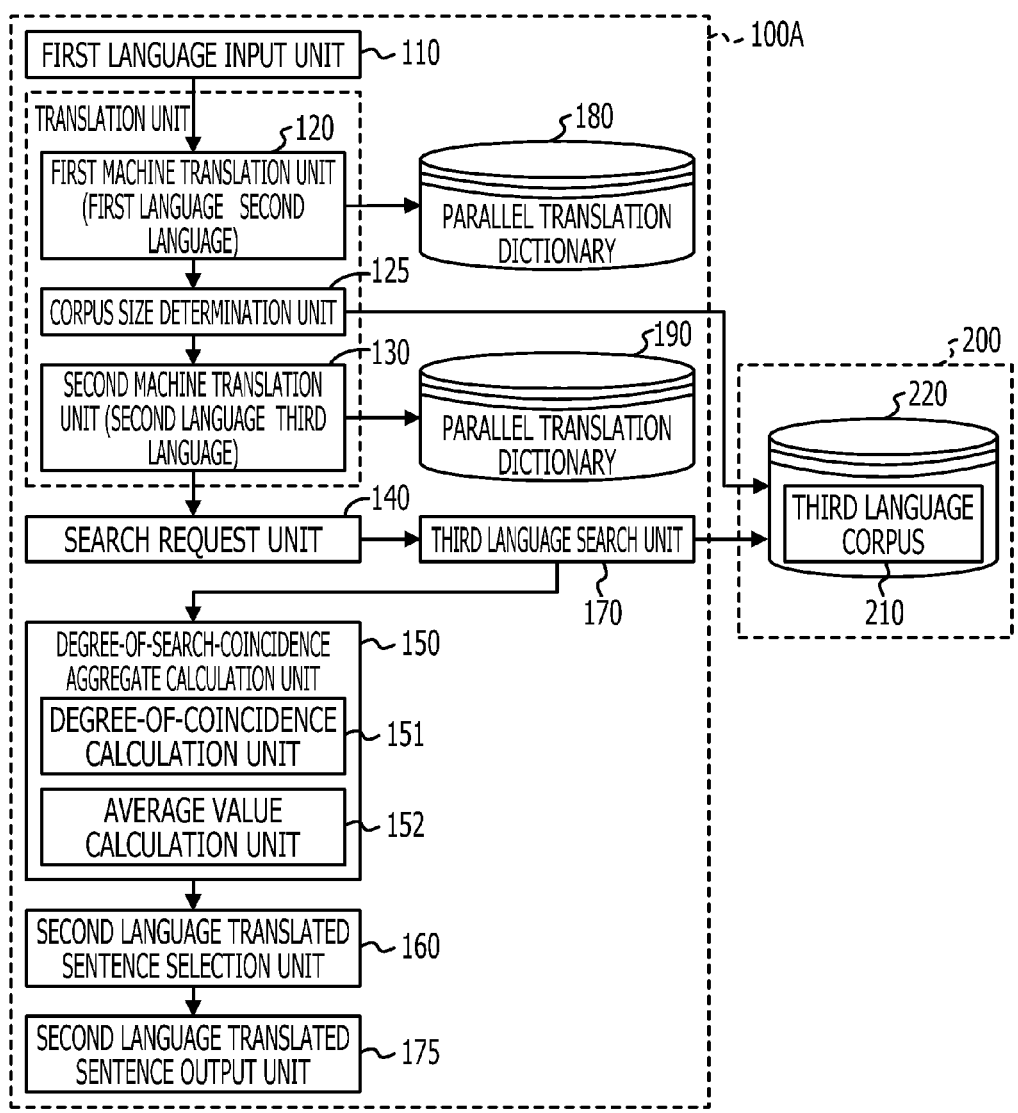
FIG. 12 illustrates an exemplary machine translation device.

FIG. 12 illustrates an exemplary machine translation device. FIG. 12 may illustrate, for example, the functional configuration of the machine translation device illustrated in FIG. 1.

A machine translation device 100A includes a first language input unit 110, a first machine translation unit 120, a second machine translation unit 130, a search request unit 140, a degree-of-search-coincidence aggregate calculation unit 150, a second language translated sentence selection unit 160, a third language search unit 170, and a second language translated sentence output unit 175. The machine translation device 100A includes a corpus size determination unit 125.

The corpus size determination unit 125 determines the size of a third language corpus 210. For example, the corpus size determination unit 125 acquires the number of example sentences stored in the third language corpus 210, and determines whether or not the number of example sentences is larger than a predetermined threshold value. When the number of example sentences is larger than the threshold value, the third language corpus 210 may be determined as a corpus having a lot of example sentences. The threshold value may be preliminarily stored in a memory unit 12 or the like in the machine translation device 100A.

Figure 13:
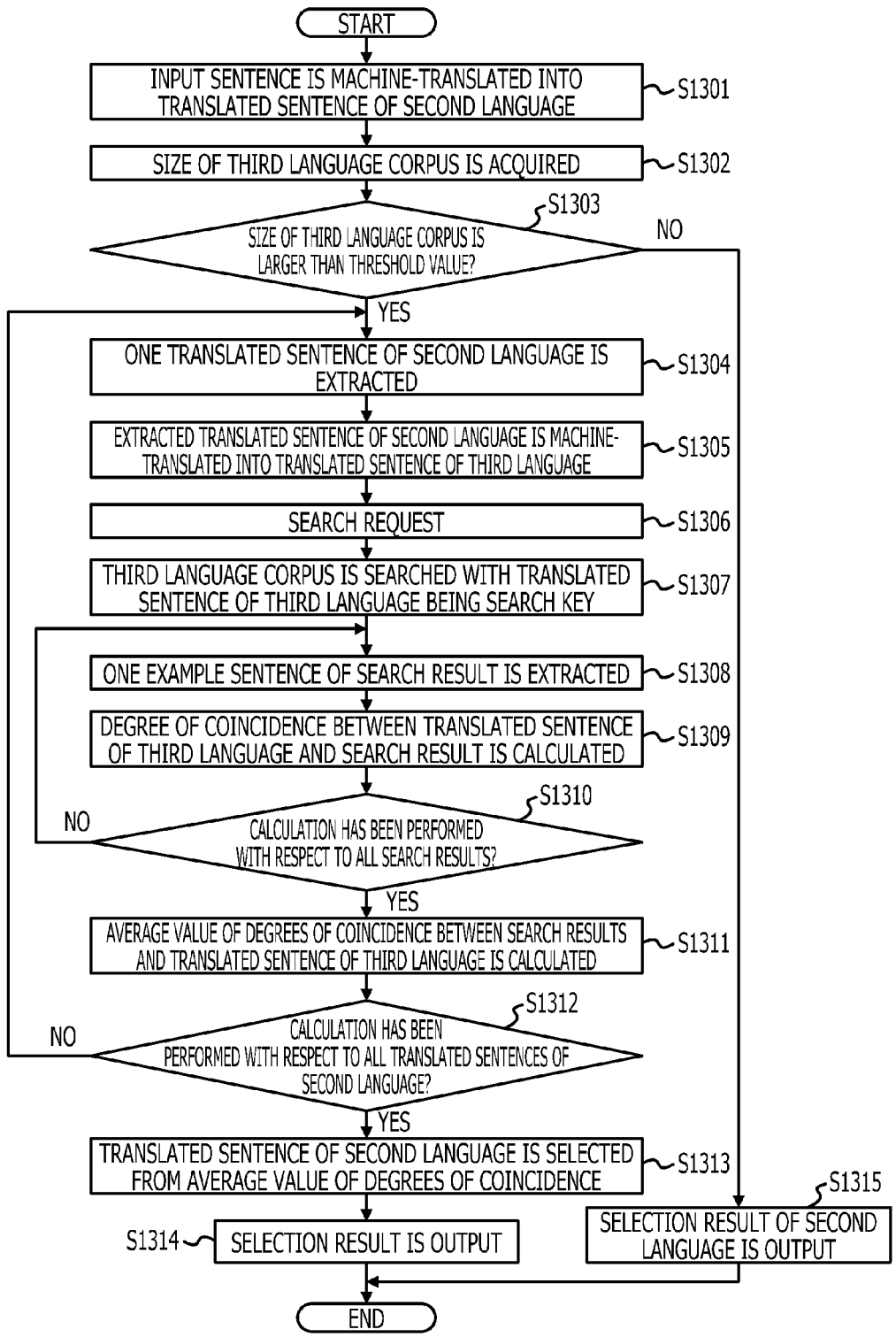
FIG. 13 illustrates an exemplary size determination.

FIG. 13 illustrates an exemplary size determination. In FIG. 13, the size of the third language corpus may be determined.

When the first language input unit 110 in the machine translation device 100A has accepted an input sentence of the first language, the first machine translation unit 120 translates the input sentence of the first language into a translated sentence of the second language, and delivers a plurality of translated sentences, which are translation results, to the second machine translation unit 130 (an operation S1301).

The corpus size determination unit 125 acquires the size of the third language corpus 210 (an operation S1302). For example, the corpus size determination unit 125 acquires the number of example sentences stored in the third language corpus 210.

The corpus size determination unit 125 determines whether or not the size of the third language corpus 210 is larger than the threshold value (an operation S1303). For example, the corpus size determination unit 125 determines whether or not the number of example sentences acquired in the operation S1302 is larger than the threshold value.

When the size of the third language corpus 210 is larger than the threshold value, the second machine translation unit 130 extracts one translated sentence from the plural translated sentences of the second language delivered from the first machine translation unit 120 (an operation S1304).

Processing operations from the operation S1304 to the operation S1314 may be substantially the same as or similar to processing operations from the operation S302 to the operation S312 illustrated in FIG. 3.

When the size of the third language corpus 210 is less than or equal to the threshold value, the machine translation device 100A outputs, as a translation result, the translated sentences of the second language, obtained in the operation S1301 (an operation S1315). For example, when, in the operation S1301, a plurality of translated sentences of the second language have been obtained, all the translated sentences of the second language may be output or a selected arbitrary sentence may be output.

Since the size of the third language corpus 210 is confirmed before a translated sentence of the second language is translated to the third language, the output of an inadequate translation result obtained by using a corpus of a language whose number of example sentences is small may be reduced.

Figure 14:
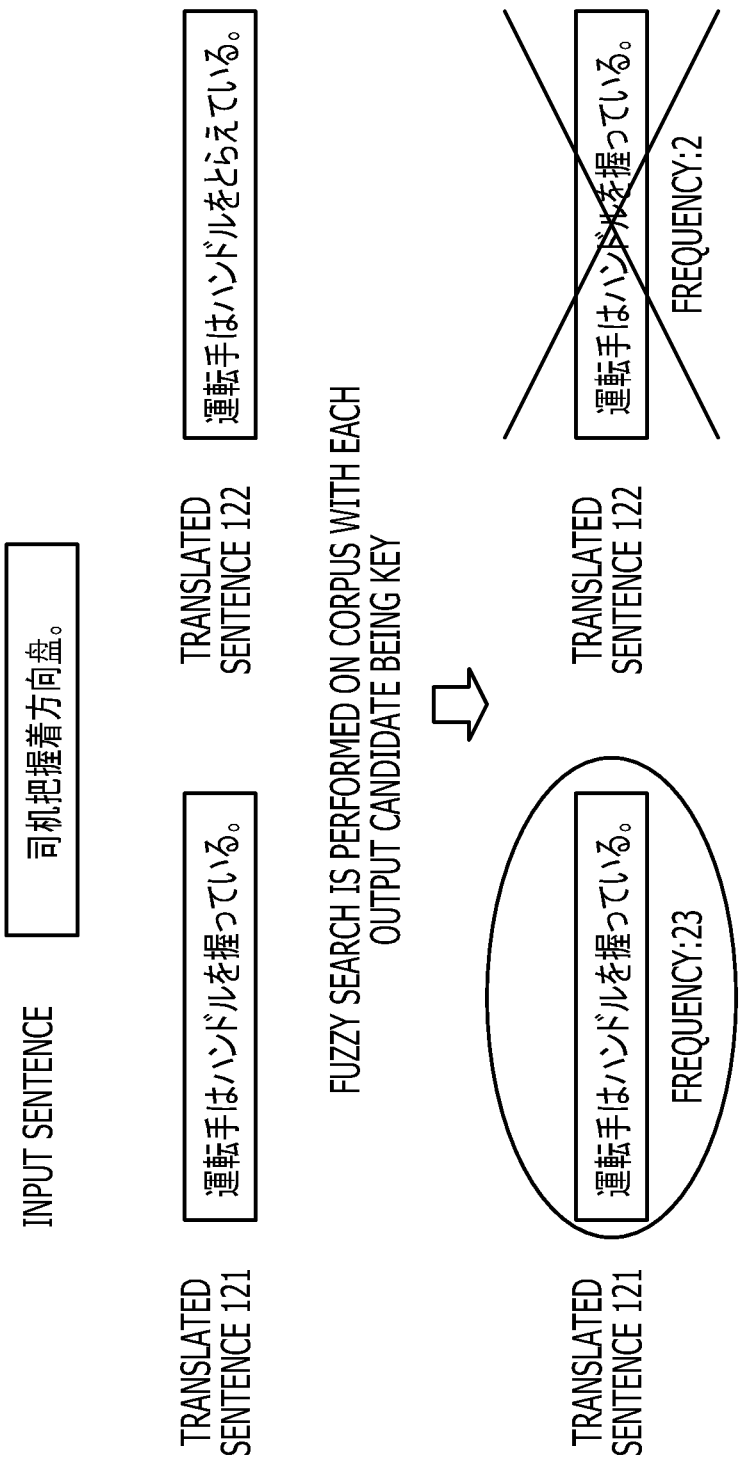
FIG. 14 illustrates an exemplary selection method.

FIG. 14 illustrates an exemplary selection method.

In FIG. 14, a plurality of translated sentences of the second language is output with respect to an input sentence of the first language, and the ambiguity of translation may occur. Using the occurrence frequency of a combination (word pair) of a word included in the input sentence and a word included in a translated sentence, a translated sentence may be selected.

In a search result of the corpus of the second language where a translated sentence 121 of the second language is a search key, 23 hits may be obtained. In a search result of the corpus of the second language where a translated sentence 122 is a search key, 2 hits may be obtained. Therefore, the translated sentence 121 may be estimated to be a translated sentence likely to occur in the second language, and the translated sentence 121 may be selected.

In FIG. 14, a sufficient search frequency may be obtained in the search of the corpus of the second language, and comparison between the frequencies of individual candidates may be performed. For example, when the size of the corpus of the second language is insufficient, sufficient search results may not be obtained with respect to both of the translated sentence 121 and the translated sentence 122. Therefore, the accuracy of translation may not be improved with solving the ambiguity of translation.

Since the corpus of the third language is used whose size is sufficient to include more example sentences than the first language and the second language, a sufficient search result may be obtained. Therefore, for example, when the corpus of the second language serving as an output language is insufficient, the ambiguity of translation may be solved and the accuracy of translation may be improved.

Figure 15:
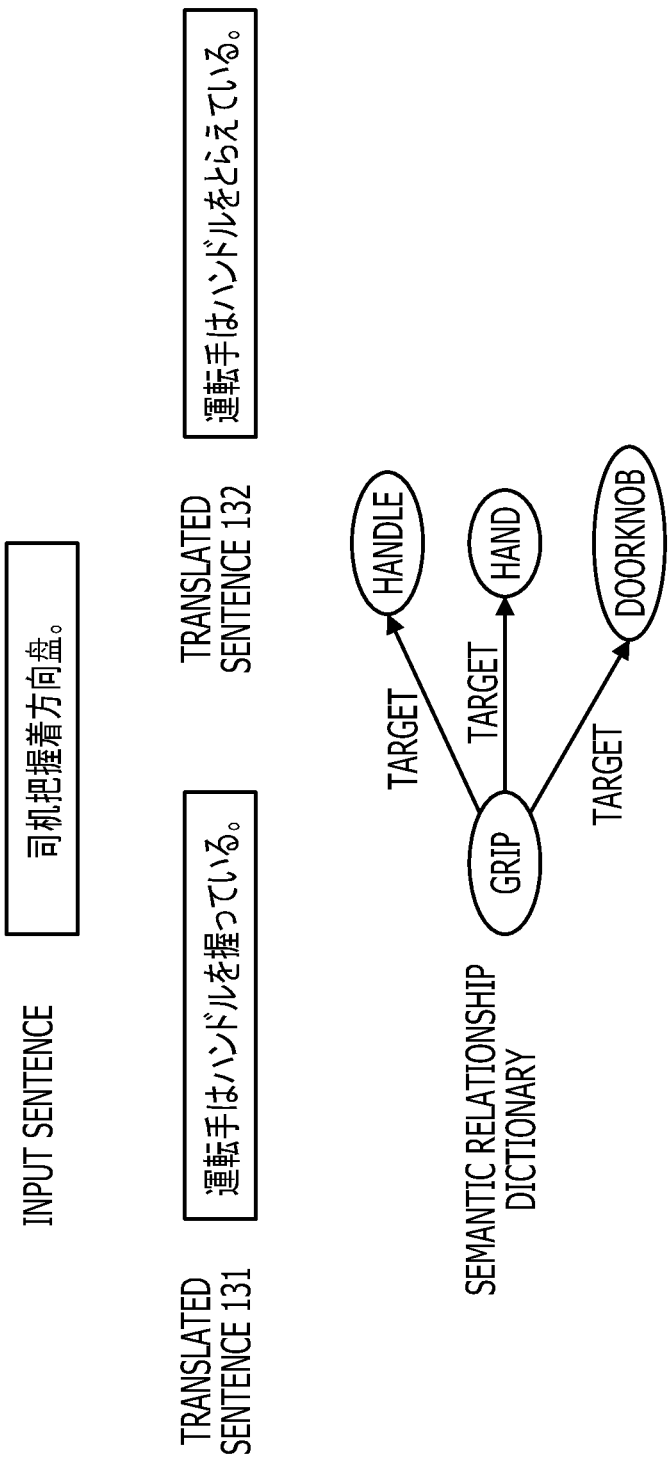
FIG. 15 illustrates an exemplary selection method.

FIG. 15 illustrates an exemplary selection method. In FIG. 15, in a case where ambiguity has occurred when an input sentence of the first language is translated into the second language, a semantic relationship dictionary is used for translated-word selection.

In FIG. 15, candidates for a translated word may be "grip" and "grasp". A translated sentence 131 including the "grip" and a translated sentence 132 including the "grasp" are generated. In the semantic relationship dictionary, while the effect that the verb "grip" adopts a noun "handle" as an object is described, a relationship between the "grasp" and the "handle" is not described. Therefore, the translated sentence 131 may be determined to have a higher certainty factor, and the translated sentence 131 may be selected as a translated sentence of the input sentence.

In FIG. 15, for example, in the combination of words whose occurrence frequency is low and which is not described in the semantic relationship dictionary, the ambiguity of translation may not be solved.

Since the corpus of the third language having the sufficient size is used, a sufficient search result may also be obtained with respect to the combination of words not described in the semantic relationship dictionary. The ambiguity of translation may be deduced, and the accuracy of translation may be improved.

Since the corpus of the third language having the sufficient size is used, cumbersome work such as the check of a co-occurrence relationship between words, performed for adjusting the semantic relationship dictionary or parallel translation data, may be reduced, and the accuracy of translation may be improved by a simple procedure.

The first language may be the Chinese language, the second language may be the Japanese language, and the third language may be the English language. The first language and the second language may be arbitrary languages, and the third language may be a language including more example sentences than the first language and the second language.

A translated sentence of the second language may be obtained from a search result obtained by searching the corpus of the third language using a first language sentence. The number of translated sentences of the second language obtained from the input sentence of the first language by the machine translation may be singular.

For example, when, in the first machine translation unit 120 illustrated in FIG. 2 or FIG. 12, a plurality of translated sentences of the second language have been obtained with respect to the input sentence of the first language, the processing illustrated in FIG. 3 or FIG. 13 may be executed.

Figure 16:
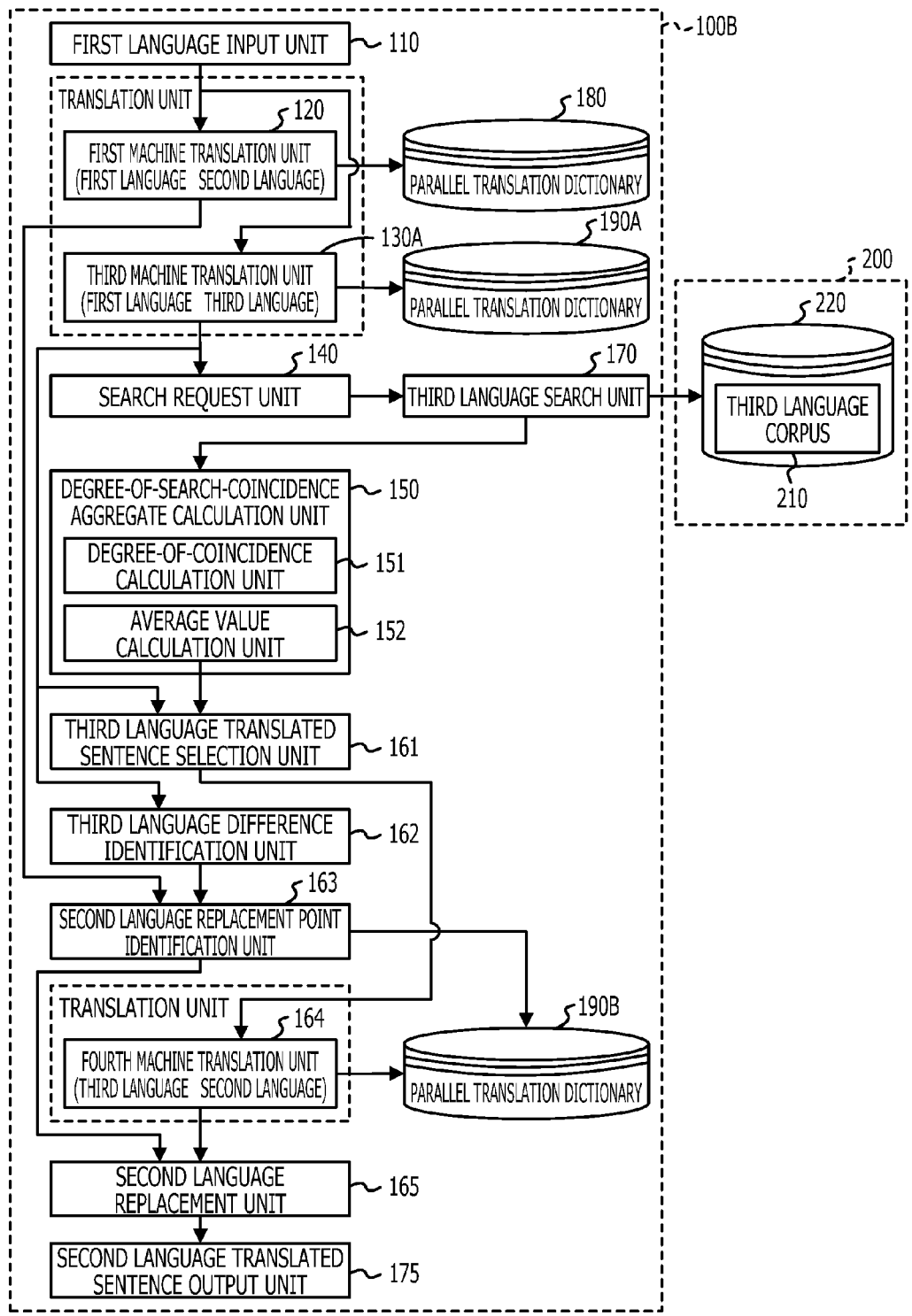
FIG. 16 illustrates an exemplary machine translation device.

FIG. 16 illustrates an exemplary machine translation device. FIG. 16 may illustrate, for example, the functional configuration of the machine translation device illustrated in FIG. 1. In FIG. 16, the same symbol may be assigned to substantially the same function as or a function similar to the function illustrated in FIG. 2 or FIG. 12, and the description thereof may be omitted or reduced.

The machine translation device 100B includes a first language input unit 110, a first machine translation unit 120, a third machine translation unit 130A, a search request unit 140, a degree-of-search-coincidence aggregate calculation unit 150, a third language search unit 170, and a second language translated sentence output unit 175. The machine translation device 100B includes a parallel translation dictionary database 180, parallel translation dictionary databases 190A and 190B, a third language translated sentence selection unit 161, a third language difference identification unit 162, a second language replacement point identification unit 163, a fourth machine translation unit 164, and a second language replacement unit 165.

The machine translation device 100B is coupled to a database device 200 through, for example, a network or the like.

A input sentence of the first language, input from the first language input unit 110, is output to the first machine translation unit 120 and the third machine translation unit 130A.

The first machine translation unit 120 translates the sentence of the first language, input from the first language input unit 110, into a translated sentence of the second language, and outputs the translated sentence of the second language to the second language replacement point identification unit 163.

With reference to the parallel translation dictionary database 190A, the third machine translation unit 130A translates, into a translated sentence of the third language, the input sentence of the first language, accepted by the first language input unit 110. The third machine translation unit 130A outputs the translated sentence of the third language to the search request unit 140, the third language translated sentence selection unit 161, and the third language difference identification unit 162. The parallel translation dictionary database 190A may be a database storing therein a dictionary indicating a correspondence relationship between the first language and the third language. The first machine translation unit 120, the third machine translation unit 130A, and the fourth machine translation unit 164 may be included in a translation unit having a multilingual translation function.

When a plurality of translated sentences of the third language have been output from the third machine translation unit 130A, the third language translated sentence selection unit 161 selects a translated sentence of the third language based on a calculation result due to the degree-of-search-coincidence aggregate calculation unit 150, and outputs the selected translated sentence of the third language to the fourth machine translation unit 164.

The third language difference identification unit 162 identifies points (differences) where translated words are different between the plural translated sentences of the third language, obtained in the third machine translation unit 130A. The third language difference identification unit 162 outputs words located at the identified points to the second language replacement point identification unit 163.

The second language replacement point identification unit 163 identifies words located at points corresponding to the points identified by the third language difference identification unit 162, in the translated sentence of the second language obtained in the first machine translation unit 120, and outputs words located at the identified points, to the second language replacement unit 165.

With reference to the parallel translation dictionary database 190B, the fourth machine translation unit 164 translates, into a translated sentence of the second language, the translated sentence of the third language selected by the third language translated sentence selection unit 161. The fourth machine translation unit 164 outputs the translated sentence of the second language to the second language replacement unit 165. The parallel translation dictionary database 190B may be a database storing therein a dictionary indicating a correspondence relationship between the second language and the third language.

The second language replacement unit 165 outputs, to the second language translated sentence output unit 175, a translated sentence of the second language obtained by replacing a word located at a corresponding point in the translated sentence of the second language from the fourth machine translation unit 164 with a word located at a point identified by the second language replacement point identification unit 163. The second language translated sentence output unit 175 outputs, as a translated sentence of the first language, the translated sentence of the second language output from the second language replacement unit 165.

Figure 17:
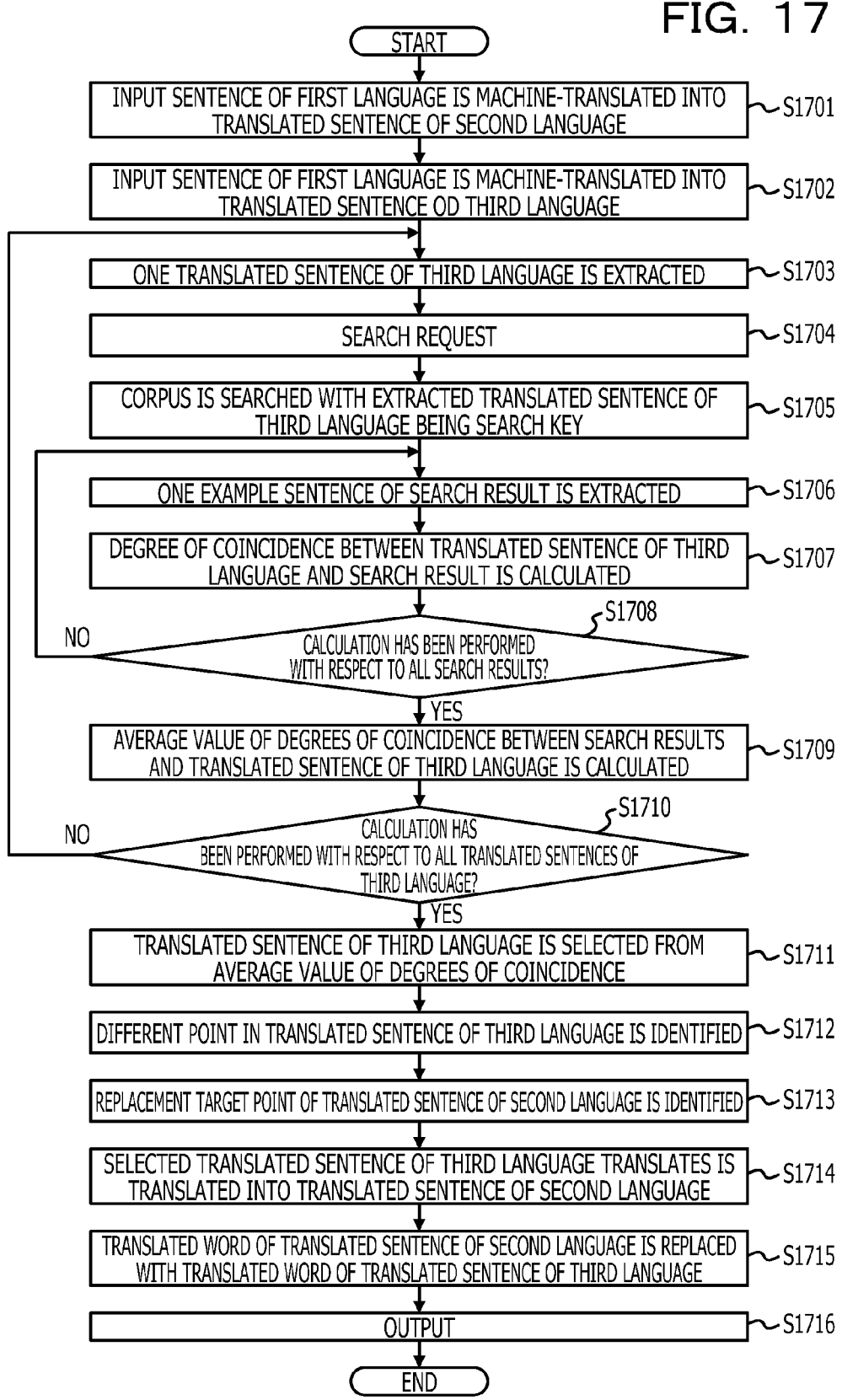
FIG. 17 illustrates an exemplary operation of a machine translation device.

FIG. 17 illustrates an exemplary operation of a machine translation device. The operation illustrated in FIG. 17 may be executed by the machine translation device illustrated in FIG. 16.

When the first language input unit 110 in the machine translation device 100B has accepted an input sentence of the first language, the first machine translation unit 120 translates the input sentence into a translated sentence of the second language with reference to the parallel translation dictionary database 180 (an operation S1701). With reference to the parallel translation dictionary database 190A, the third machine translation unit 130A translates the input sentence of the first language into a translated sentence of the third language (an operation S1702). The third machine translation unit 130A may obtain a plurality of translated sentences of the third language. The plural translated sentences obtained in the third machine translation unit 130A are delivered to the search request unit 140.

The search request unit 140 extracts one translated sentence from the plural translated sentences of the third language (an operation S1703). The search request unit 140 requests the third language search unit 170 to search using the extracted translated sentence as the search key (an operation S1704).

Processing operations from the operation S1705 to the operation S1709 may be substantially the same as or similar to processing operations from the operation S305 to the operation S309 illustrated in FIG. 3.

The degree-of-search-coincidence aggregate calculation unit 150 determines whether or not the average value of the degrees of coincidence has been calculated with respect to all the translated sentences of the third language, obtained in the operation S1702 (an operation S1710). When the average value has not been calculated with respect to all the translated sentences of the third language, the processing returns to the operation S1703. When the average value has been calculated with respect to all the translated sentences of the third language, the processing proceeds to an operation S1711.

The third language translated sentence selection unit 161 selects, as a translated sentence of the third language corresponding to the input sentence of the first language, a translated sentence of the third language where the average value of the degrees of coincidence is the highest (an operation S1711).

The third language difference identification unit 162 identifies a point where the translated sentence of the third language selected in the operation S1711 and another translated sentence of the third language obtained in the operation S1702 (an operation S1712) are different. With reference to the parallel translation dictionary database 190B, the second language replacement point identification unit 163 identifies a point corresponding to the point identified in the operation S1712, within the translated sentence of the second language obtained in the operation S1701 (operation S1713).

With reference to the parallel translation dictionary database 190B, the fourth machine translation unit 164 translates, into a translated sentence of the second language, the translated sentence of the third language selected in the operation S1711 (an operation S1714). The second language replacement unit 165 replaces the point of the translated sentence of the second language identified in the operation S1713 with a translated word located at a corresponding point within the translated sentence of the second language obtained in the operation S1714 (an operation S1715). The second language translated sentence output unit 175 outputs the result of the operation S1715, as a translated sentence of the second language of the input sentence of the first language (an operation S1716).

For example, the first language may be the Chinese language, the second language may be the Japanese language, and the third language may be the English language.

FIG. 18 illustrates an exemplary processing performed in a first machine translation unit. The first machine translation unit 120 illustrated in FIG. 16 may execute the processing illustrated in FIG. 18. When having accepted input of the input sentence 41 of the first language, the first machine translation unit 120 translates the input sentence 41 into a translated sentence of the second language with reference to the parallel translation dictionary database 180. For example, the translated sentence 43 may be obtained as a translated sentence corresponding to the input sentence 41. The input sentence 41 is delivered to the third machine translation unit 130A.

Figure 19:
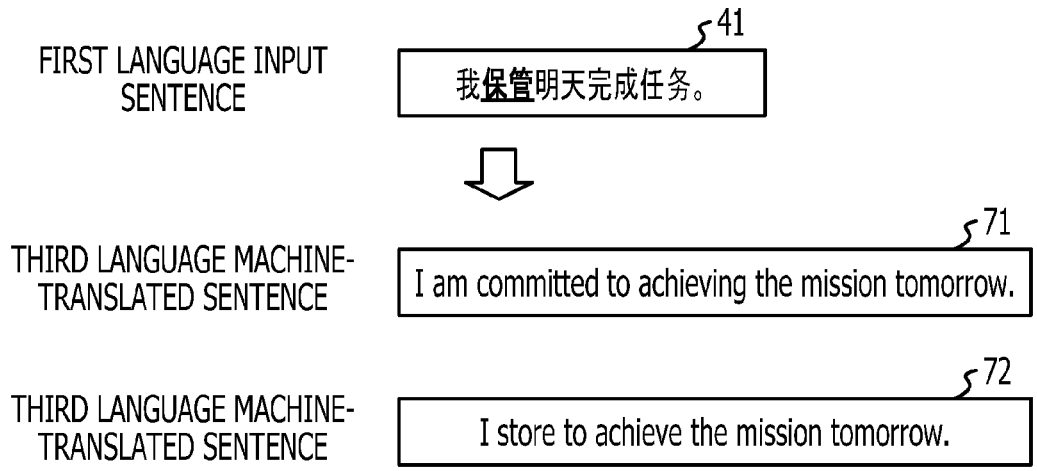
FIG. 19 illustrates an exemplary processing of a third machine translation unit.

FIG. 19 illustrates an exemplary processing performed in a third machine translation unit. The third machine translation unit 130A illustrated in FIG. 16 may execute the processing illustrated in FIG. 19. The third machine translation unit 130A translates the input sentence 41 into a translated sentence of the third language with reference to the parallel translation dictionary database 190A. For example, as translated sentences of the third language corresponding to the input sentence 41, a translated sentence 71 and a translated sentence 72 may be obtained. The translated sentence 71 and the translated sentence 72 are delivered to the search request unit 140, as search keys of the third language corpus 210.

FIG. 20 illustrates an exemplary processing of a search request unit and an exemplary processing of a third language search unit. The search request unit 140 and third language search unit 170, illustrated in FIG. 16, may execute the processing illustrated in FIG. 20. The search request unit 140 requests the third language search unit 170 to search using the translated sentence 71 of the third language as the search key. The third language search unit 170 performs fuzzy search on the third language corpus 210 using the translated sentence 71 as the search key, and acquires a search result. For example, as the search result, search result sentences 711, 712, 713, and 714 are acquired. The search result sentences 711 to 714 are delivered to the degree-of-search-coincidence aggregate calculation unit 150.

FIG. 21 illustrates an exemplary processing of a search result aggregate calculation unit. The search result aggregate calculation unit illustrated in FIG. 16 may execute the processing illustrated in FIG. 21. The degree-of-coincidence calculation unit 151 in the degree-of-search-coincidence aggregate calculation unit 150 extracts the search result sentence 711, and calculates the degree of coincidence with the translated sentence 71 serving as a search key.

The number of words included in the translated sentence 71 may be eight, and the number of words included in the search result sentence 711 may be seven. The number of words coincident in the translated sentence 71 and the search result sentence 711 may be six. As the allocation of coincident words with respect to the total number of words of the translated sentence 71 and the search result sentence 711, the degree-of-coincidence calculation unit 151 calculates 2×6÷(8+7)=0.80, as the degree of coincidence between the translated sentence 71 and the search result sentence 711. The degree-of-coincidence calculation unit 151 also performs the same calculation with respect to the search result sentences 712, 713, and 714, and individually calculates the degrees of coincidence between the translated sentence 71 and the individual search result sentences 711 to 714.

The average value calculation unit 152 calculates the average value of the degrees of coincidence between the translated sentence 71 and the individual search result sentences 711 to 714. Since the degrees of coincidence between the translated sentence 71 and the search result sentences 711 to 714 are 0.80, 0.71, 0.67, and 0.56, respectively, the average value calculation unit 152 calculates an average value 75 of the four degrees of coincidence. The average value 75=0.685 may be satisfied. The average value 75 may be a value calculated according to the translated sentence 71 of the third language.

After the average value of the degrees of coincidence between the translated sentence 71 and the search result sentences 711 to 714 has been calculated, the machine translation device 100B performs the same processing with respect to the second translated sentence 72 of the third language.

Figure 22:
FIG. 22 illustrates an exemplary processing of a search request unit and an exemplary processing of a third language search unit.

FIG. 22 illustrates an exemplary processing of a search request unit and an exemplary processing of a third language search unit. The search request unit 140 and the third language search unit 170, illustrated in FIG. 16, may execute the processing illustrated in FIG. 22. The search request unit 140 requests the third language search unit 170 to search using the translated sentence 72 of the third language as the search key. The third language search unit 170 performs fuzzy search on the third language corpus 210 using the translated sentence 72 as the search key, and acquires a search result. As the search result, search result sentences 721, 722, 723, and 724 are acquired. The search result sentences 721 to 724 are delivered to the degree-of-search-coincidence aggregate calculation unit 150.

FIG. 23 illustrates an exemplary of a search result aggregate calculation unit. The degree-of-coincidence calculation unit 151 in the degree-of-search-coincidence aggregate calculation unit 150 extracts the search result sentence 721, and calculates the degree of coincidence with the translated sentence 72 serving as a search key.

The number of words included in the translated sentence 72 may be seven, and the number of words included in the search result sentence 721 may be twelve. The number of words coincident in the translated sentence 72 and the search result sentence 721 may be three. As the allocation of coincident words with respect to the total number of words of the translated sentence 72 and the search result sentence 721, the degree-of-coincidence calculation unit 151 calculates 2×3÷(7+12)=0.32, as the degree of coincidence between the translated sentence 72 and the search result sentence 721. The degree-of-coincidence calculation unit 151 also performs the same calculation with respect to the search result sentences 722, 723, and 724, and individually calculates the degrees of coincidence between the translated sentence 72 and the individual search result sentences 721 to 724.

The average value calculation unit 152 calculates the average value of the degrees of coincidence between the translated sentence 72 and the individual search result sentences 721 to 724. Since the degrees of coincidence between the translated sentence 72 and the search result sentences 721 to 724 are 0.32, 0.27, 0.38, and 0.44, respectively, the average value calculation unit 152 calculates an average value 76 of the four degrees of coincidence. The average value 76=0.352 may be satisfied. The average value 76 may be a value calculated according to the translated sentence 72 of the third language.

The degree-of-search-coincidence aggregate calculation unit 150 determines whether or not the average values of all the translated sentences of the third language obtained by the translation due to the third machine translation unit 130A have been calculated. For example, since translated sentences of the third language are the translated sentence 71 and the translated sentence 72, the machine translation device 100B may proceed to subsequent processing.

Figure 24:
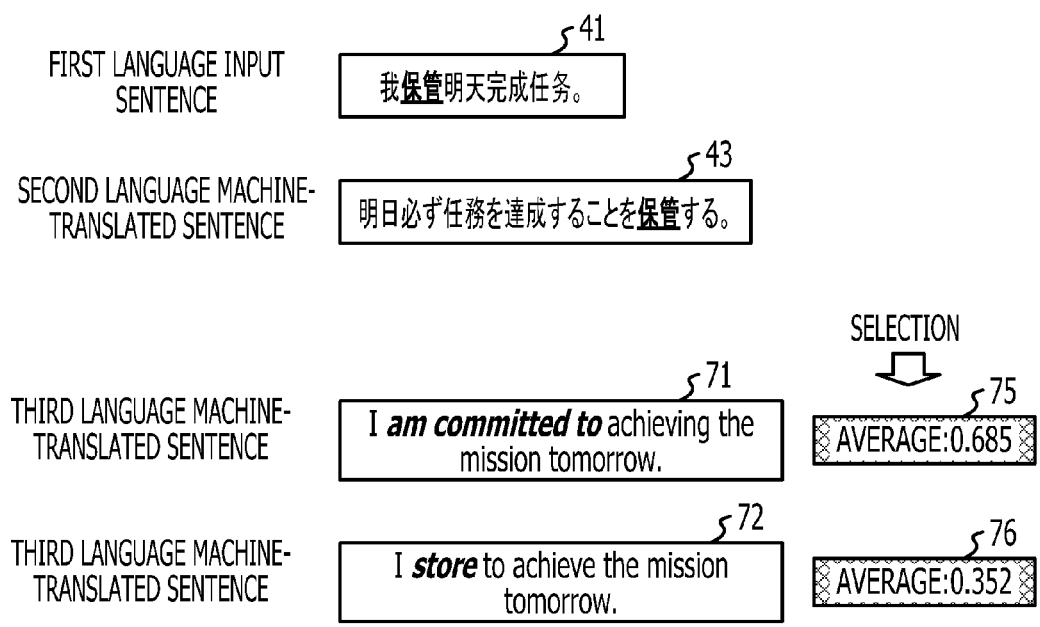
FIG. 24 illustrates an exemplary processing of a third language translated sentence selection unit.

FIG. 24 illustrates an exemplary processing of a third language translated sentence selection unit. As a translated sentence of the third language of the input sentence 41, the third language translated sentence selection unit 161 selects one translated sentence whose average value is larger, from among the translated sentence 71 and the translated sentence 72, obtained in the third machine translation unit 130A.

For example, the average value 75 corresponding to the translated sentence 71 may be 0.685, and the average value 76 corresponding to the translated sentence 72 may be 0.352. The third language translated sentence selection unit 161 may select the translated sentence 71 as a translated sentence of the third language of the input sentence 41.

Figure 25:
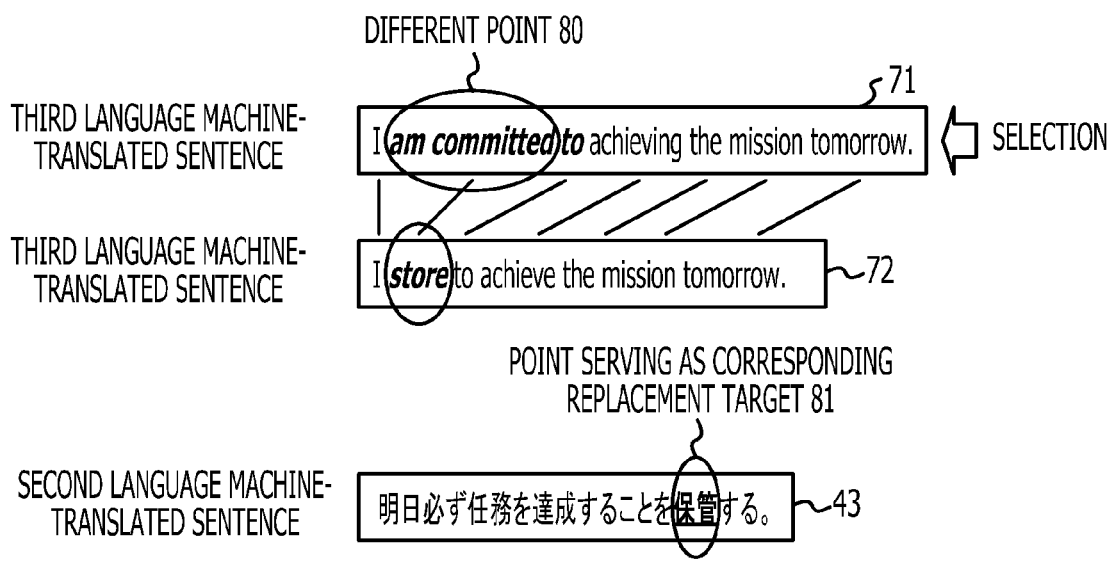
FIG. 25 illustrates an exemplary processing of a third language difference identification unit and an exemplary processing of a second language replacement point identification unit.

FIG. 25 illustrates an exemplary processing a third language difference identification unit and an exemplary processing of a second language replacement point identification unit. The third language difference identification unit 162 and the second language replacement point identification unit 163, illustrated in FIG. 16, may execute the processing illustrated in FIG. 25.

The third language difference identification unit 162 identifies a point within the translated sentence 71 which is different from the translated sentence 72. For example, "am committed" of the translated sentence 71 may be identified as a point 80 different from "store" of the translated sentence 72.

When the point 80 has been identified, the second language replacement point identification unit 163 refers to the parallel translation dictionary database 190B, and identifies a point 81 that corresponds to the point 80 and is located within the translated sentence 43 of the second language which is obtained in FIG. 18. The translated word 81 may be a translated word to be a replacement target of a word. For example, the translated word 81 corresponding to "am committed" serving as the point 80 may be "store".

Figure 26:
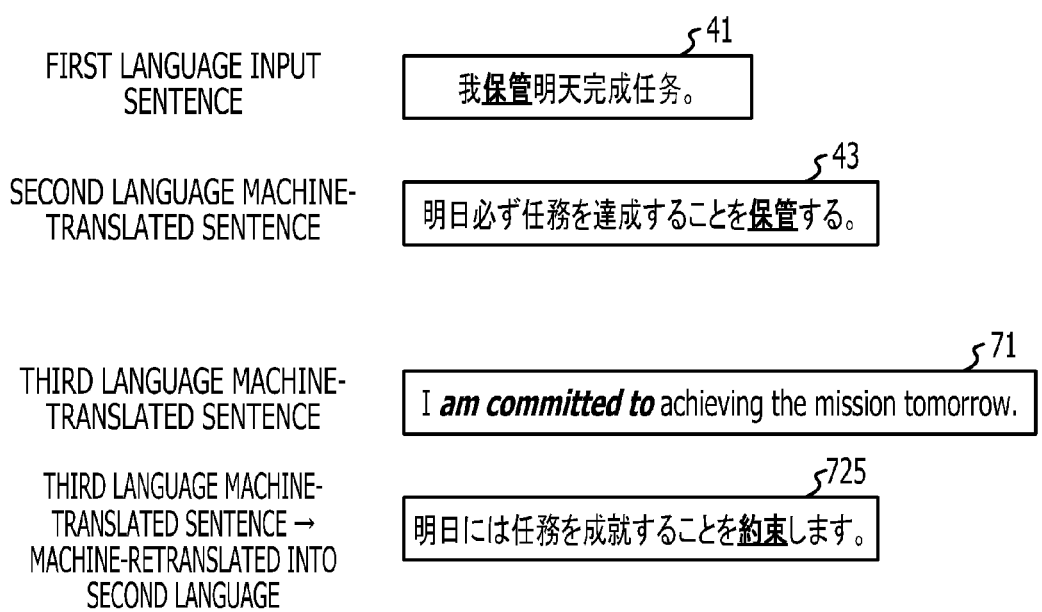
FIG. 26 illustrates an exemplary processing of a fourth machine translation unit.

FIG. 26 illustrates an exemplary processing of a fourth machine translation unit. The fourth machine translation unit illustrated in FIG. 16 may execute the processing illustrated in FIG. 26. The fourth machine translation unit 164 translates, into a translated sentence 725 of the second language, the translated sentence 71 of the third language which is selected based on the processing illustrated in FIG. 24.

Figure 27:
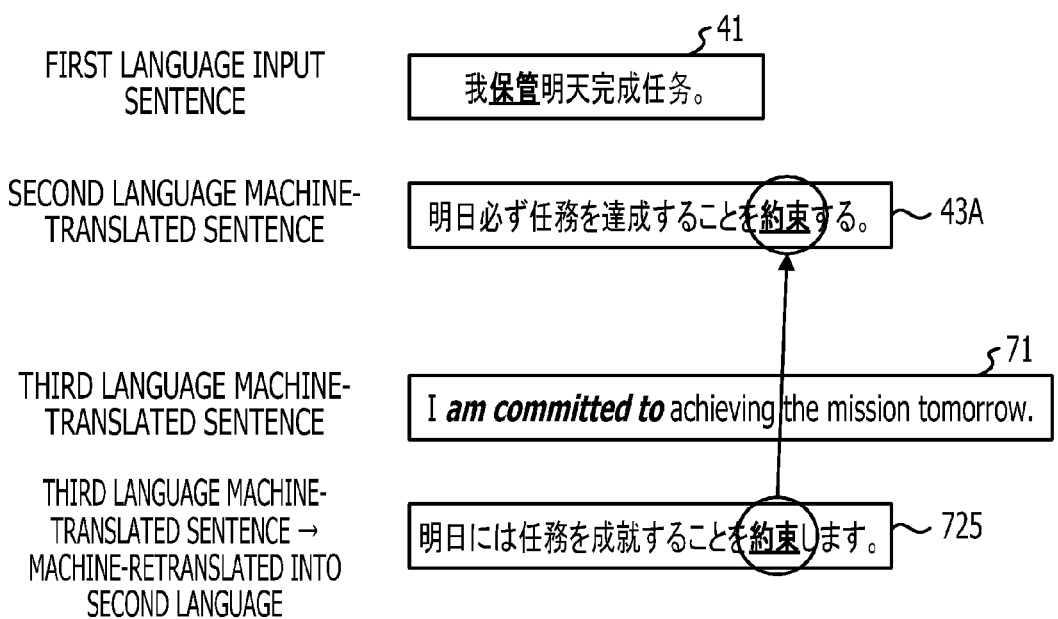
FIG. 27 illustrates an exemplary processing of a second language replacement unit.

FIG. 27 illustrates an exemplary processing of a second language replacement unit. The second language replacement unit 165 illustrated in FIG. 16 may execute the processing illustrated in FIG. 27. The second language replacement unit 165 replaces the translated word 81 identified within the translated sentence 43 with a word that corresponds to the translated word 81 and is located within a translated sentence 725 of the second language.

For example, a word that is located within the translated sentence 725 and corresponds to the translated word 81 may be "am committed". The second language replacement unit 165 may replace the translated word 81 "store" with the word "am committed". A translated sentence 43A of the second language is obtained that includes a post-replacement translated word 81A where the "store" is replaced with the "am committed".

The second language translated sentence output unit 175 outputs the translated sentence 43A of the second language as a translated sentence of the second language of the input sentence 41.

Since the translated sentence 43 is a translated sentence of the second language where the input sentence 41 is directly translated, the translated sentence 43 may be adequate as a translated sentence. When, for example, an inadequate translated word is included in the translated sentence 43, an adequate translated word may be obtained using the third language having a large corpus including many example sentences. For example, since, using a translated sentence of the third language, it is determined whether or not the translated sentence of the second language obtained in the first machine translation unit 120 is adequate, an inadequate translated sentence of the second language may be revised to an adequate translated word.

Since the input sentence of the first language is translated into a translated sentence of the third language having a large corpus including many example sentences, a translated sentence of the second language including an inadequate translated word may be replaced with an adequate translated word. Using a simple procedure, the accuracy of translation may be improved.

The machine translation device 100B may cause the display unit 13 to display, for example, a translation result of the first machine translation unit 120. For example, when an instruction for retranslation has been received from a user of the machine translation device 100B, the processing in FIG. 17 may be executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A machine translation device that translates a first language sentence into a second language sentence, the machine translation device comprising:
   a processor configured to execute a program: and
   a memory configured to store the program, wherein the processor, based on the program, performs operations to:
   translate the first language sentence of a first language into an intermediate second language sentence of a second language;
   acquire a size of a corpus of a third language;
   determine whether or not the size of the corpus of the third language is larger than a threshold value;
   translate the intermediate second language sentence into a third language sentence of the third language when the size of the corpus of the third language is larger than the threshold value;
   output the intermediate second language sentence when the size of the corpus of the third language is less than or equal to the threshold value;
   search a database that stores the corpus of the third language including more example sentences of the third language than example sentences of the first language and the second language using the third language sentence as a search key to acquire one or more other third language sentences;
   determine, based on the one or more other third language sentences, a final second language sentence of the second language corresponding to the first language sentence as the second language sentence;
   calculate a degree of coincidence between the search key and each example sentence of the third language in the search result; and
   calculate an average value of the degrees of coincidence, wherein the average value is set as the degree of coincidence corresponding to the search key.

2. The machine translation device according to claim 1, wherein the processor outputs, as the second language sentence, a second language sentence corresponding to the third language sentence serving as the search key where the average value of the degrees of coincidence is the highest.

3. The machine translation device according to claim 1, wherein the processor, when a plurality of intermediate second language sentences corresponding to the first language sentence exist, translates each of the plurality of intermediate second language sentences into the third language sentence.

4. The machine translation device according to claim 1, wherein the processor, when a plurality of intermediate second language sentences corresponding to the first language sentence exist, selects the final second language sentence where the average value is the highest as the second language sentence.

5. The machine translation device according to claim 1, wherein the processor translates the first language sentence into the third language sentence when the number of the intermediate second language sentences corresponding to the first language sentence is singular.

6. The machine translation device according to claim 1, wherein the processor selects, in the one or more other third language sentences, a third language sentence in which the average value of the degrees of coincidence is the highest.

7. The machine translation device according to claim 6, wherein the processor
   identifies a point where a translated word is different between a selected third language sentence and a remainder of the one or more other third language sentences; and
   identifies a translated word corresponding to the point in the intermediate second language sentence.

8. The machine translation device according to claim 7, wherein the processor
   translates, into the final second language sentence, the selected third language sentence; and
   replaces the point with a translated word corresponding to the identified translated word within the final second language sentence.

9. The machine translation device according to claim 1, wherein the processor
   requests to search the database using the third language sentence as the search key; and executes fuzzy search on the database using the search key in response to the search request.

10. A machine translation method to translate a first language sentence into a second language sentence, the machine translation method comprising:

translating, by a computer, the first language sentence of a first language into an intermediate second language sentence of a second language;

acquiring a size of a corpus of a third language;

determining whether or not the size of the corpus of the third language is larger than a threshold value;

translating the intermediate second language sentence into a third language sentence of the third language when the size of the corpus of the third language is larger than the threshold value;

outputting the intermediate second language sentence when the size of the corpus of the third language is less than or equal to the threshold value;

searching a database storing the corpus of the third language including more example sentences of the third language than example sentences of the first language and the second language using the third language sentence as a search key to acquire one or more other third language sentences;

determining, based on the one or more other third language sentences, a final second language sentence of the second language corresponding to the first language sentence as the second language sentence;

calculating a degree of coincidence between the search key and each example sentence of the third language in the search result;

calculating an average value of the degrees of coincidence; and setting the average value as the degree of coincidence corresponding to the search key.

11. The machine translation method according to claim 10, further comprising:

translating, when a plurality of intermediate second language sentences corresponding to the first language sentence exist, each of the plurality of intermediate second language sentences into the third language sentence.

12. The machine translation method according to claim 10, further comprising:

translating the first language sentence into the third language sentence when the number of the intermediate second language sentences corresponding to the first language sentence is singular.

13. The machine translation method according to claim 10, further comprising:

requesting to search the database using the third language sentence as the search key; and executing fuzzy search on the database using the search key in response to the search request.

14. A non-transitory recording medium storing a machine translation program to be executed by a computer, the program comprising a set of code for causing the computer to:

translating the first language sentence of a first language into an intermediate second language sentence of a second language;

acquiring a size of a corpus of a third language;

determining whether or not the size of the corpus of the third language is larger than a threshold value;

translating the intermediate second language sentence into a third language sentence of the third language when the size of the corpus of the third language is larger than the threshold value;

outputting the intermediate second language sentence when the size of the corpus of the third language is less than or equal to the threshold value;

searching a database storing the corpus of the third language including more example sentences of the third language than example sentences of the first language and the second language using the third language sentence as a search key to acquire one or more other third language sentences;

determining, based on the one or more other third language sentences, a final second language sentence of the second language corresponding to the first language sentence as the second language sentence;

calculating a degree of coincidence between the search key and each example sentence of the third language in the search result;

calculating an average value of the degrees of coincidence; and setting the average value as the degree of coincidence corresponding to the search key.

15. The machine translation method according to claim 14, further comprising:

outputting, as the second language sentence, a second language sentence corresponding to the third language sentence serving as the search key where the average value of the degrees of coincidence is the highest.

16. The machine translation method according to claim 14, further comprising:

selecting, when a plurality of intermediate second language sentences corresponding to the first language sentence exist, the final second language sentence where the average value is the highest as the second language.

* * * * *